(12) United States Patent
Lopusnik et al.

(10) Patent No.: US 9,082,425 B2
(45) Date of Patent: Jul. 14, 2015

(54) MAGNETIC SHIELD WITH FLUX CONCENTRATION FEATURE

(75) Inventors: Radek Lopusnik, Bloomington, MN (US); Kirill Aleksandrovich Rivkin, Edina, MN (US); Mourad Benakli, Bloomington, MN (US); James Gary Wessel, Savage, MN (US); Scott Michael Franzen, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 283 days.

(21) Appl. No.: 13/100,984

(22) Filed: May 4, 2011

(65) Prior Publication Data

US 2012/0281314 A1    Nov. 8, 2012

(51) Int. Cl.
*G11B 5/127* (2006.01)
*G11B 5/11* (2006.01)
*G11B 5/31* (2006.01)

(52) U.S. Cl.
CPC ............... *G11B 5/112* (2013.01); *G11B 5/315* (2013.01); *G11B 5/1278* (2013.01); *G11B 5/3116* (2013.01)

(58) Field of Classification Search
CPC ...... G11B 5/112; G11B 5/315; G11B 5/1278; G11B 5/3116
USPC ........................................................ 360/125.3
See application file for complete search history.

(56) References Cited

U.S. PATENT DOCUMENTS

| 5,615,069 | A | 3/1997 | Slade et al. | |
| 7,212,379 | B2 | 5/2007 | Hsu et al. | |
| 7,265,941 | B2 | 9/2007 | Le et al. | |
| 7,508,630 | B2 * | 3/2009 | Matono | 360/125.02 |
| 7,576,951 | B2 * | 8/2009 | Allen et al. | 360/125.13 |
| 7,712,206 | B2 * | 5/2010 | Jiang et al. | 29/603.16 |
| 7,715,147 | B2 * | 5/2010 | Feldbaum et al. | 360/125.3 |
| 7,768,743 | B2 * | 8/2010 | Guthrie et al. | 360/125.13 |
| 7,848,054 | B2 * | 12/2010 | Hsiao et al. | 360/125.09 |
| 7,969,684 | B2 * | 6/2011 | Le et al. | 360/125.3 |
| 7,995,307 | B2 * | 8/2011 | Zheng | 360/125.13 |
| 8,051,552 | B2 * | 11/2011 | Jiang et al. | 29/603.16 |
| 8,120,874 | B2 * | 2/2012 | Hsiao et al. | 360/119.04 |
| 8,189,294 | B2 * | 5/2012 | Edelman et al. | 360/125.3 |
| 2006/0000794 | A1 * | 1/2006 | Le | 216/22 |
| 2006/0044682 | A1 * | 3/2006 | Le et al. | 360/126 |
| 2006/0245109 | A1 * | 11/2006 | Hsu et al. | 360/126 |
| 2007/0115584 | A1 * | 5/2007 | Balamane et al. | 360/126 |
| 2007/0211384 | A1 * | 9/2007 | Hsiao et al. | 360/126 |
| 2007/0258167 | A1 * | 11/2007 | Allen et al. | 360/126 |
| 2008/0068747 | A1 * | 3/2008 | Sasaki et al. | 360/110 |
| 2008/0148552 | A1 * | 6/2008 | Pentek et al. | 29/603.01 |
| 2008/0244896 | A1 * | 10/2008 | Bonhote et al. | 29/603.01 |
| 2008/0271308 | A1 * | 11/2008 | Hsiao et al. | 29/603.16 |
| 2008/0273276 | A1 * | 11/2008 | Guan | 360/319 |
| 2009/0168240 | A1 * | 7/2009 | Hsiao et al. | 360/125.02 |
| 2009/0226760 | A1 | 9/2009 | Bonhote et al. | |
| 2011/0205671 | A1 * | 8/2011 | Benakli et al. | 360/319 |
| 2011/0261485 | A1 * | 10/2011 | Pentek et al. | 360/122 |

* cited by examiner

*Primary Examiner* — Julie Anne Watko
(74) *Attorney, Agent, or Firm* — Hall Estill Attorneys at Law

(57) ABSTRACT

A magnetic shield may be capable of enhancing magnetic writing, particularly in transducing elements accessing data bits from data tracks. At least one magnetic shield is adjacent a write pole. The shield has a flux concentration feature on an air bearing surface (ABS) capable of enhancing magnetic undershoot between the shield and the write pole.

20 Claims, 4 Drawing Sheets

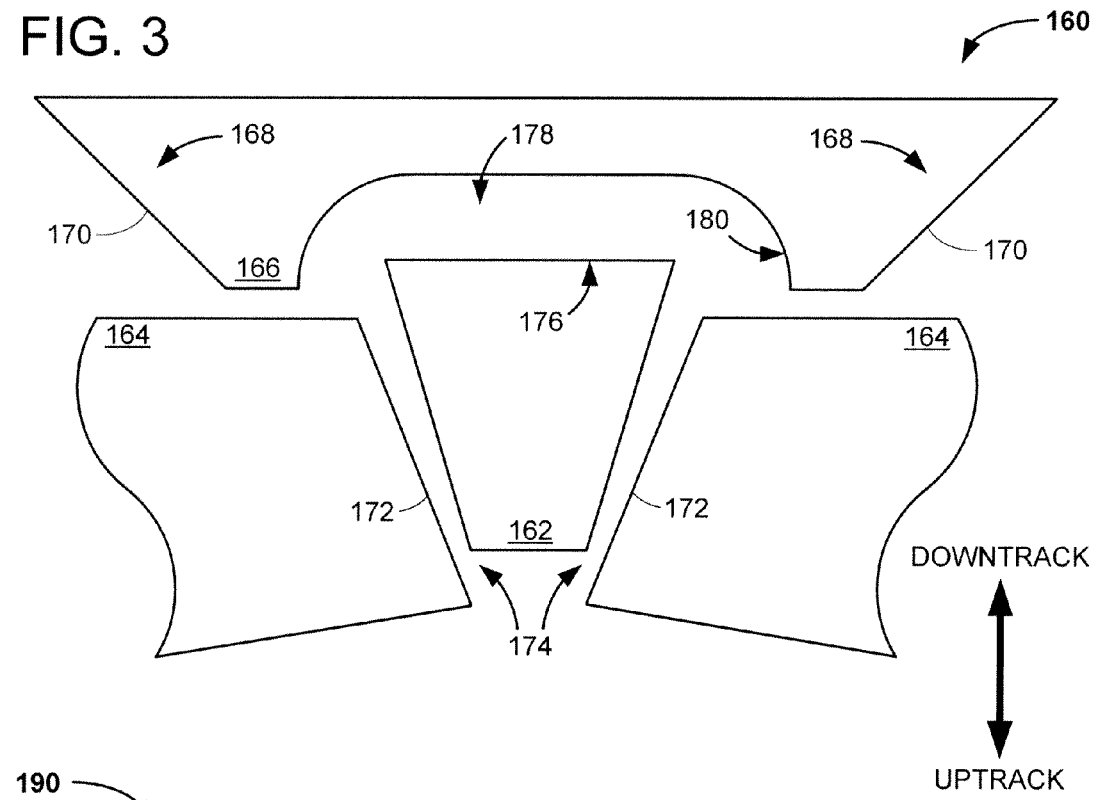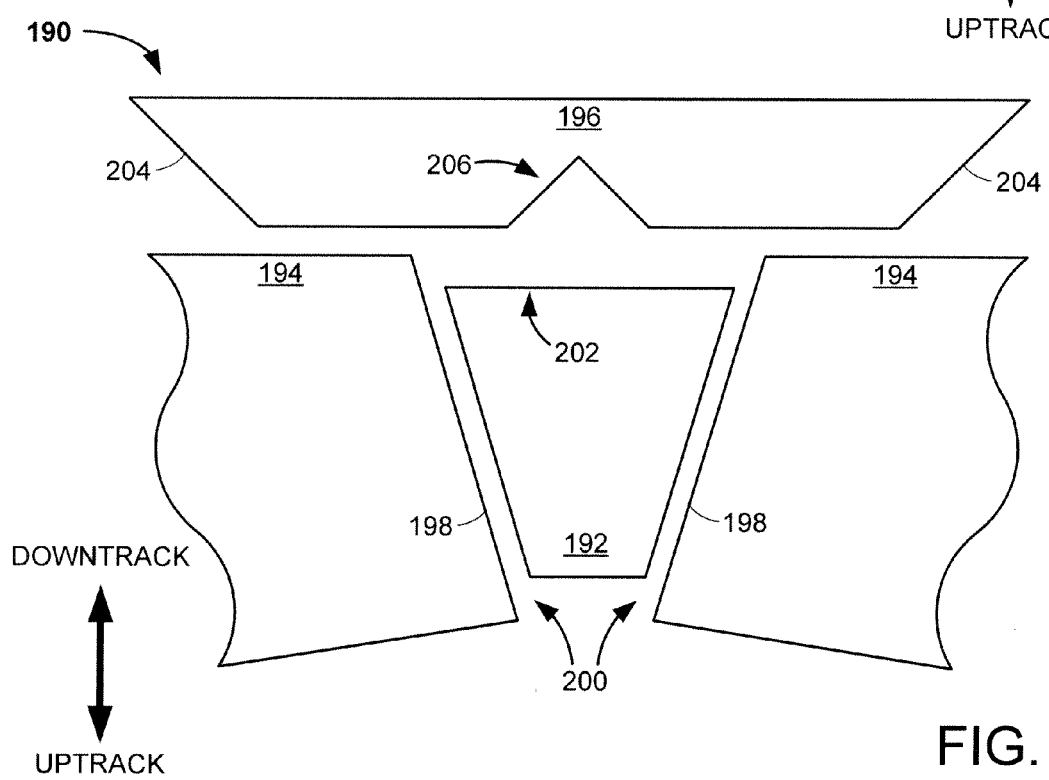

MAGNETIC SHIELD WITH FLUX CONCENTRATION FEATURE

SUMMARY

Various embodiments of the present invention are generally directed to a magnetic shield that is capable of defining a predetermined track.

In accordance with various embodiments, at least one magnetic shield is adjacent a write pole. The shield has a flux concentration feature on an air bearing surface (ABS) capable of enhancing magnetic undershoot between the shield and the write pole.

BRIEF DESCRIPTION OF THE DRAWINGS

FIG. 3 shows a portion of the magnetic element of FIG. 2 as viewed from the air bearing surface (ABS).

FIG. 4 displays an embodiment of the magnetic element of FIG. 2 as viewed from the ABS.

DETAILED DESCRIPTION

The present disclosure generally relates to magnetic shields capable of defining a predetermined track, such as in the context of writing elements used in data transducing heads. As electronics devices become more sophisticated, demand for higher data capacity has placed added emphasis on the size of data written to a data storage media. With a higher data capacity often relying on fitting more bits in a given area on a storage media, the ability for a magnetic writing element to precisely program ever smaller bits plays an increasingly important role.

Accordingly, various embodiments of the present invention are generally directed to a magnetic shield adjacent a write pole and configured with at least one flux concentration feature on an air bearing surface (ABS) that enhances magnetic undershoot between the shield and write pole. Such magnetic undershoot enhancement increases the magnetic field of the write pole and improves the ability to program bits in a miniscule portion of a magnetic media. While the ability to write bits in a small area of the media can lead to increased data density, an ability to precisely write the bits without affecting any adjacent bits is where the magnetic shields of the present disclosure provide practical benefits.

Figure 1:
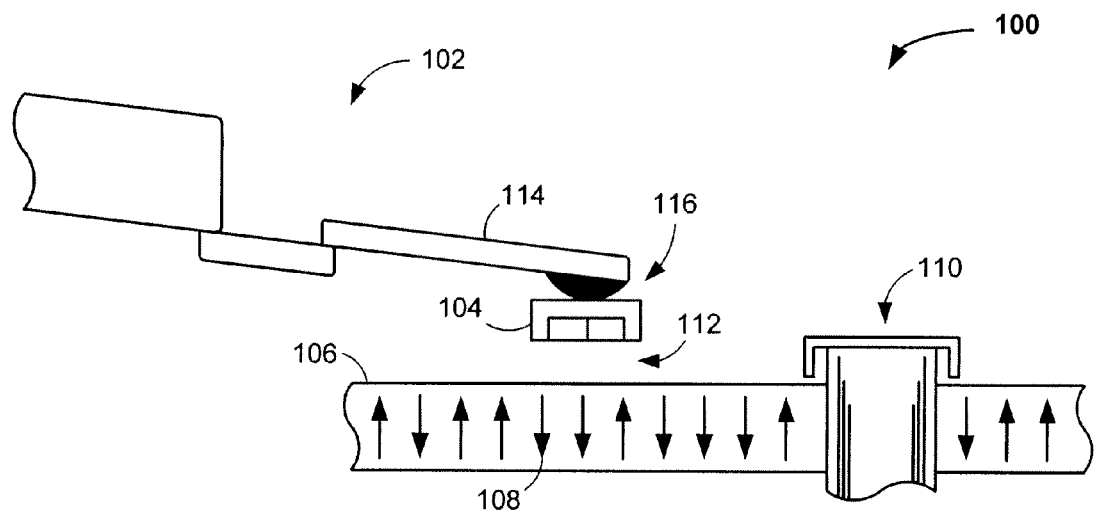
FIG. 1 is a block representation of an example portion of a data storage device.

An example of a data transducing portion 100 of a data storage device is provided in FIG. 1. As shown, the transducing portion 100 is present in a non-limiting environment in which various embodiments of the present invention can be practiced. The transducing portion 100 has an actuating assembly 102 that positions a transducing head 104 over a magnetic storage media 106 that is capable of storing programmed bits 108. The storage media 106 is attached to a spindle motor 110 that rotates during use to produce an air bearing surface (ABS) 112 on which a slider portion 114 of the actuating assembly 102 flies to position a head gimbal assembly (HGA) 116, which includes the transducing head 104, over a predetermined portion of the media 106.

The transducing head 104 can include one or more transducing elements, such as a magnetic writer and magnetically responsive reader, which operate to program and read data from the storage media 106, respectively. In this way, controlled motion of the actuating assembly 102 causes the transducers to align with tracks (not shown) defined on the storage media surfaces to write, read, and rewrite data.

It is to be understood that within the confines of this disclosure, magnetic undershoot is an operational parameter that causes the vertical component of the magnetic field to change direction. As such, magnetic undershoot enable a high write field gradient $$\left(\frac{dH}{dx}\right)$$

either at the sides of a predetermined track, within the track, or both. Improved gradient at the sides of the track corresponds to more reliable track edge integrity. A high write field gradient within the track also creates sharper delineation between consecutive bits in a track.

Figure 2:
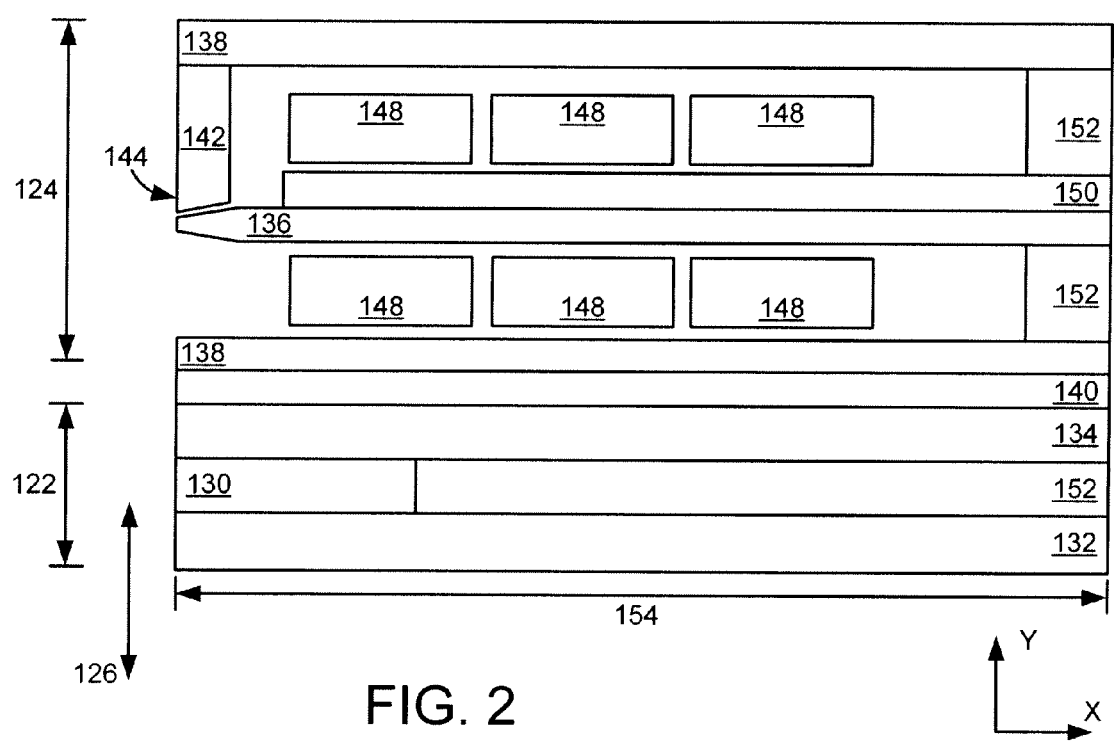
FIG. 2 generally illustrates an embodiment of a magnetic element capable of being used in the portion of the data storage device displayed in FIG. 1.

FIG. 2 displays a cross-sectional block representation of an embodiment of a transducing head 120 that is capable of being used in the actuating assembly of FIG. 1. The head 120 can have one or more magnetic elements, such as the magnetic reader 122 and writer 124, which can operate individually or concurrently to write data to or retrieve data from an adjacent storage media, such as media 106 of FIG. 1. Each magnetic element 122 and 124 is constructed of a variety of shields and a transducing element that act to read data from and write data to a corresponding data medium along a data track 126.

As displayed, the magnetic reading element 122 has a magnetoresistive layer 130 disposed between leading and trailing shields 132 and 134. Meanwhile, the writing element 124 has a write pole 136 and at least one return pole 138 that creates a writing circuit to impart a predetermined magnetic orientation to the adjacent storage media. As shown, two return poles 138 are contactingly adjacent a non-magnetic gap layer 140 and trailing shield 142, respectively, that prevent flux from the poles 136 and 138 from extending beyond the bounds of the writing element 124. Each return pole 138 further contacts insulating material 144 that maintains magnetic separation of the writing poles 136 and 138.

In some embodiments, the insulating material 144 can have an ABS feature 146 that aids in delivering magnetic flux from the write pole 136 to a predetermined area of a rotating media, such as media 106 of FIG. 1. The writing element 124 further includes a coil 148 that can be one or many individual wires and a yoke 150 that attaches to the write pole 136 and operates with the coil 148 to impart a magnetic flux that travels from the write pole 136 through magnetically conductive vias 152 to conclude at the return pole 138. Additional insulating layers can be included, without limitation, to surround the coil 148, write pole 138, and MR layer 130 to prevent leakage of magnetic flux within the transducing head 120.

The shields of the transducing head 120 can be characterized by their position with respect to the timing of encountering external bits, such as bits 106 of FIG. 1. In other words, the shields that encounter the external bits before the transducing elements 122 and 124 are "leading" shields while shields that see the bits after the transducing elements are "trailing" shields. Such characterization extends to the difference between "upstream" or "downstream" of the transducing elements in that, depending on the direction of travel for the head 120 and external bits, the shields can be either leading or trailing and either upstream or downstream.

The transducing head 120, and each of the respective layers, has a predetermined thickness measured along a Y plane, and a stripe height 154 measured along an X plane. With respect to the shields 132, 134, 140, and 142, the respective shape and dimensions do not vary along the stripe height 154. As such, each shield maintains a predetermined thickness throughout the extent of each shield's stripe height.

With the data track 126 getting smaller to allow more densely programmed storage media, premium is placed on more precise definition of the track 126, especially at the trailing edge of the write pole 136 where large amounts of magnetic flux is emitted and can inadvertently program bits outside the track 126. Accordingly, portions of the shields surrounding the write pole 136 can be configured with features on the ABS to better focus magnetic flux and more precisely define the data track 126, as generally illustrated in FIG. 3.

In FIG. 3, a block representation of a portion of an embodiment of a magnetic element 160 is displayed as viewed from the ABS. It is to be understood that FIG. 3 is generally illustrated as aligned with a predetermined track where the bottom portion of the element 160 is uptrack and will encounter a magnetic bit before a downtrack portion at the top of the element 160. As a write pole 162 encounters a rotating magnetic media, side shields 164 work in concert with the trailing shield 166 to focus magnetic flux about the write pole 162 and define a write track. As discussed above, the write track can be susceptible to magnetic leakage that can inadvertently program bits distal to the track, despite the addition of the side shields 164 on lateral sides of the write pole 162.

Consequently, one or more of the shields 164 and 166 that are positioned adjacent the write pole 162 can have one or more flux concentration features that restrict magnetic flux to the predetermined track by enhancing magnetic undershoot. One such flux concentration feature can be on the lateral sides 168 of the trailing shield 166 where a tapered surface 170 serves to focus magnetic flux. The tapered surface 170 increases the width of the trailing shield 166 in a downtrack direction. Hence, the trailing shield 166 is more narrow closer to the write pole 162 which concentrates magnetic flux about the pole 162.

Such concentration of flux about the write pole 162 can provide beneficial increase in magnetic undershoot, which counteracts the development of erasure fields and improves downtrack magnetic gradient. With such improvement in downtrack gradient, the demarcation of data bits is improved, which corresponds to increased data density and enhanced data sensing. The concentration of flux further creates torque that speeds up the response of the trailing shield 166 and limits the influence of a remnant magnetic state in the trailing shield 166.

The use of tapered surfaces to generate strong magnetic undershoot can also be practiced in one or both of the side shields 164 where the surface 172 facing the write pole 162 on the ABS tapers to narrow a write gap 174 between the side shield 164 and the write pole 162. By gradually reducing the distance between the side shields 164 in an uptrack direction, erasure magnetic fields are greatly reduced at the edges of the write pole 162 and predetermined track can reliably write data to a smaller areal space on the magnetic media.

While the distance from the write pole 162, degree of taper of surface 172, and side shield 164 size are not limited to a particular configuration, in some embodiments, the side shields 162 are oriented to extend to a plane that is uptrack from the trailing edge 176 of the write pole 162, as shown. The position of the side shields 164 uptrack from the trailing edge 176 of the write pole 162 allows the trailing shield 166 to extend to a plane uptrack from the trailing edge 176 and engage the write pole 162 from lateral and trailing sides.

The trailing shield 166 can be configured with another flux concentration feature centered about the write pole 162 in the form of an area of reduced thickness 178 that operates to translate erasure magnetic fields uptrack to the side shields 164 and create strong undershoot. In various embodiments, the area of reduced thickness 178 has a continually angular sidewalls 180 that extends uptrack from the trailing edge 176 of the write pole 162. The angular sidewall 180 provides a concave surface facing the trailing corners of the write pole 162, which allows the trailing shield to "wrap around" the write pole and improve magnetic field gradient in the upper corners of write pole 162 due, at least in part, to the trailing shield generally being magnetized in the opposite polarity as the write pole.

The various numbers and configurations of flux concentration features shown in FIG. 3 is merely an example and can be modified, either individually or collectively. FIG. 4 displays such a modified magnetic element 190 as viewed from the ABS. The element 190 has a write pole 192 disposed between a pair of side shields 194 and a trailing shield 196. The side shields 194 each have a tapered surface 198 that faces the write pole 192, but unlike the tapered surfaces 172 in FIG. 3, the surfaces 198 do not reduce the write gap 200 between the pole 192 and the side shields 194.

The side and trailing shields 194 and 196 are each configured to extend to a plane downtrack of the trailing edge 202 of the write pole 192. The trailing shield 196 has a first flux concentration feature in the form of tapered lateral surfaces 204 that narrow the width of the trailing shield 196 proximal to the write pole 192, as discussed above. Another flux concentration feature of the trailing shield 196 is an area of reduced thickness 206 that is triangular in shape and centered about the longitudinal axis of the write pole 192. The triangle notch flux concentration feature 206 improves write field gradient at the edges of the track, but slightly degrades center track gradient, which provides enhanced performance due to data track quality typically being worse at the edges than in the center.

Figure 5A:
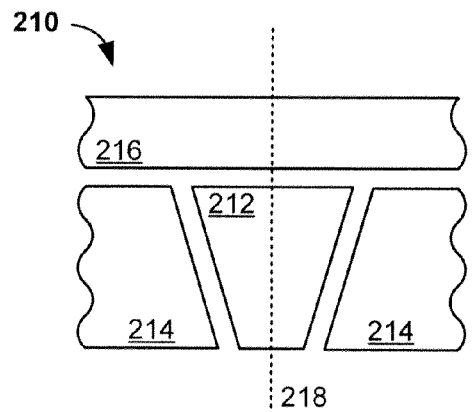
FIGS. 5A-5D illustrate examples of shield configurations capable of being used in the magnetic element of FIG. 2.

The symmetric configuration of the trailing shield about the write pole can alternatively be achieved with a uniform leading edge that laterally extends crosstrack, as displayed in the shielding configuration 210 of FIG. 5A. The shielding configuration 210 illustrates that the write pole 212 can have a uniform write gap surrounding the pole 212 and both the side shields 214 and trailing shield 216. Such a uniform write gap contributes to the symmetry of the configuration 210 with respect to a longitudinal axis 218 running parallel to the movement of the storage media and predetermined track thereon.

Figure 5B:
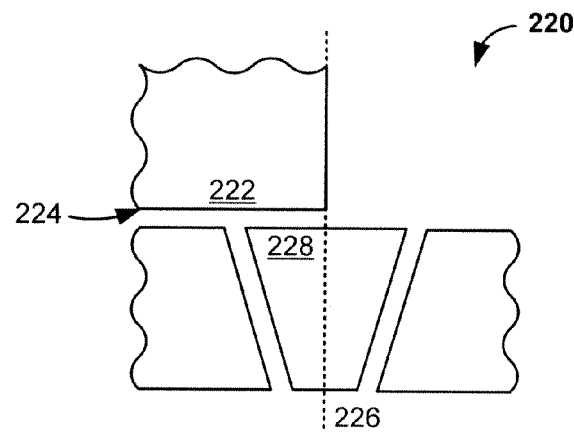
Figure 5C:
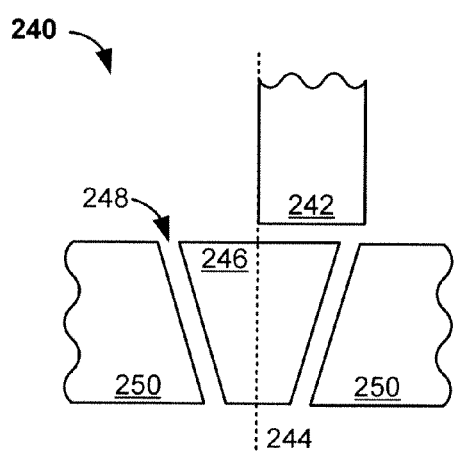
Figure 5D:
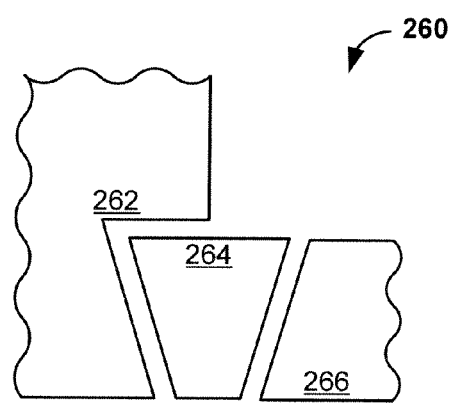

However, magnetic shielding is not required to be symmetric about the write pole for applications such as shingled magnetic recording in which the data tracks of interest are written by only one side of the pole. In fact, practical benefits have been observed for asymmetrical shielding configurations, such as configuration 220 of FIG. 5B. With an asymmetric design, the trailing shield 222 does not have a leading edge 224 that is symmetric with respect to the longitudinal axis 226 of the write pole 228. As shown in FIGS. 5B-5D, an asymmetrical trailing shield is biased towards a lateral side of the write pole, which concentrates flux about the write pole and improves magnetic field gradient, transition curvature, and predetermined track precision.

An alternative asymmetric shield configuration 240 is displayed in FIG. 5C. In contrast to the trailing shield 222 of FIG. 5B which extends laterally past the write gap between the write pole 228 and side shield 230, the trailing shield 242 of FIG. 5C extends only from the longitudinal axis 244 of the write pole 246 to the edge of the write gap 248 between the pole 246 and the side shield 250. The narrow leading edge of the trailing shield 242 proximal to the write pole 246 provides a greater write field by the write pole 246 which corresponds to increased write field magnitude and gradient.

While the trailing shield can be separated from the write pole and side shields by a gap of insulating material, a side shield can be designed to extend downtrack from the trailing edge of the write pole to function as a trailing shield, as displayed in shield configuration 260 of FIG. 5D. With a side shield 262 at least partially surrounding a lateral side of the write pole 264, magnetic undershoot is enhanced through concentration of magnetic flux to the selected later side of the write pole 264 with the surrounding side rather than the opposing lateral side with the non-surrounding shield 266.

The various shield configurations of FIGS. 5A-5C, however, are not limited to the embodiments displayed and can be modified and combined, at will, to tune the performance characteristics of the write pole and the precision of the track width. Such tuning of the shield configurations do not require the presence of lateral side shields to enhance performance, as generally illustrated in FIGS. 3, 4, 5B, and 5C.

Figure 6:
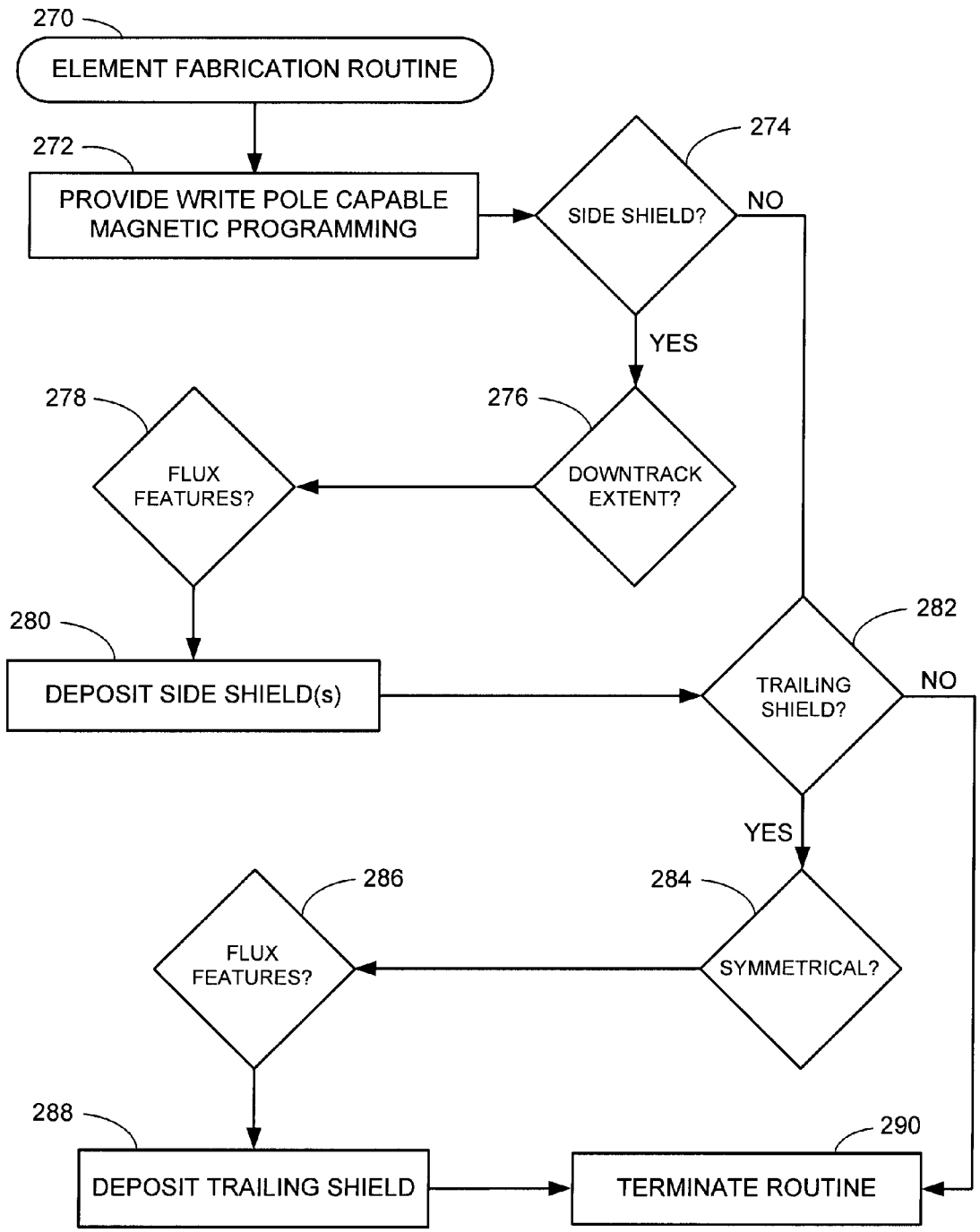
FIG. 6 provides a flowchart mapping an element fabrication routine conducted in accordance with various embodiments of the present invention.

FIG. 6 provides an element fabrication routine 270 conducted in accordance with various embodiments of the present invention. Initially, routine 270 provides a write pole in step 272 that is capable of programming magnetic bits on an adjacent storage media across an ABS. A series of decisions follow step 272 as the various shielding components are evaluated to arrive at a configuration that provides enhanced performance, such as write field strength, magnetic track edge gradient, and track width precision.

Decision 274 determines if side shields are to be installed on lateral sides of the write pole. A need for side shields proceeds to decision 276 where the downtrack extent of the side shields is chosen. As shown in FIGS. 3-4, side shields can extend to a plane uptrack, downtrack, or equal to the trailing edge of the write pole. Hence, decision 276 determines how far downtrack the side shields will extend.

With the design of the side shields resolved, decision 278 provides the number, position, and design of any flux concentration feature to be included in the element. As can be appreciated from previous discussion, no flux concentrating features or several features can be included in the side shields, as necessary. Step 280 finally deposits the side shields with the preselected size, shape, and any flux concentration features.

Decision 282 is then encountered to evaluate the need for a trailing shield. If a trailing shield is chosen, decision 284 determines between a symmetrical or asymmetrical trailing shield with respect to the longitudinal axis. Such trailing shield design is subsequently designed with at least one flux concentration feature in decision 286 to enhance magnetic undershoot and improve write field gradient at the track edges. Step 288 finally deposits the trailing shield with the predetermined design and flux concentrating features.

Through the routine 270, a shielding configuration is determined, installed, and ultimately terminated at step 290. However, the routine is not required or limited as the various decisions and steps can be omitted, changed, and added. For example, a decision in step 276 to create a side shield with a trailing extension instead of a trailing shield can modify the routine 270 to omit step 282 and proceed with adding any flux concentration features to the side shields.

It can be appreciated that the configuration and material characteristics of the magnetic shields described in the present disclosure allows for improved magnetic programming through enhancement of undershoot between the shields and the write pole. Such enhanced undershoot improves write field gradient that corresponds to a more precise track on a storage media. Moreover, the increased precision at the edges of the magnetic track reliably prevent the inadvertent programming of bits distal to the track. In addition, while the embodiments have been directed to magnetic sensing, it will be appreciated that the claimed invention can readily be utilized in any number of other applications, including data storage device applications.

It is to be understood that even though numerous characteristics and configurations of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising:
   a first magnetic shield adjacent a write pole, the first magnetic shield having a first thickness and a smaller second thickness, the second thickness defining a second thickness area facing three sides of the write pole from at least a predetermined distance and aligned about a longitudinal axis of the write pole on an air bearing surface (ABS); and
   a second magnetic shield positioned laterally from the write pole.

2. The apparatus of claim 1, wherein the second thickness area is symmetrical about the longitudinal axis.

3. The apparatus of claim 1, wherein the second magnetic shield faces the write pole and is tapered in relation to a sidewall of the write pole, a first write gap distance between the write pole and the second magnetic shield at a first write gap plane being greater than a second write gap distance at a second write gap plane positioned an uptrack direction in relation to the first write gap plane.

4. The apparatus of claim 1, wherein the second magnetic shield extends to a plane that is uptrack of a trailing edge of the write pole.

5. The apparatus of claim 1, wherein the first magnetic shield is a trailing shield with a taper on a lateral surface of the trailing shield that narrows the trailing shield proximal to the write pole.

6. The apparatus of claim 5, wherein the second thickness area has linear sidewalls.

7. The apparatus of claim 1, wherein the first magnetic shield is a trailing shield that extends to a plane that is uptrack of a trailing edge of the write pole.

8. The apparatus of claim 7, wherein the second thickness area is separated from the write pole by a non-magnetic material.

9. The apparatus of claim 8, wherein the second thickness area has continuously curvilinear sidewalls that provide a concave surface towards the write pole.

10. An magnetic writing element comprising:
a write pole;
at least one magnetic side shield lateral to the write pole and extending to a first plane uptrack of a trailing edge of the write pole, the side shield having a tapered write gap surface facing the write pole on an air bearing surface (ABS); and
a magnetic trailing shield downtrack from the write pole and extending to a second plane uptrack of the trailing edge of the write pole, the trailing shield having at least one tapered side surface on the ABS that narrows the trailing shield from a first width distal the write pole to a second width proximal to the write pole, the magnetic trailing shield having a first thickness and a smaller second thickness, the second thickness defining a second thickness area aligned about a longitudinal axis of the write pole on the ABS.

11. The magnetic writing element of claim 10, wherein the magnetic trailing shield continuously extends a predetermined distance from the ABS.

12. The magnetic writing element of claim 10, wherein the tapered write gap and side surfaces each continuously taper at different predetermined angles.

13. The magnetic writing element of claim 10, wherein the tapered side surface increases the width of the magnetic trailing shield in a downtrack direction with respect to the write pole on the ABS.

14. The magnetic writing element of claim 10, wherein the side and trailing shields are each separated from the write pole by a non-magnetic material.

15. A data writer comprising:
at least one magnetic shield adjacent a write pole; and
means for providing a predetermined magnetic undershoot between the shield and the write pole, wherein the means comprises a side shield having a taper side shield surface facing the write pole and a trailing shield having a first thickness and a smaller second thickness, the second thickness defining a second thickness area facing three sides of the write pole from at least a predetermined distance.

16. The data writer of claim 15, wherein the means for providing a predetermined magnetic undershoot comprises the second thickness area aligned along a longitudinal axis of the write pole.

17. The data writer of claim 15, wherein the taper side shield surface has a different angular orientation than a write pole sidewall surface.

18. The data writer of claim 15, wherein the means for providing a predetermined magnetic undershoot comprises a trailing shield having a tapered lateral surface on an air bearing surface.

19. The apparatus of claim 1, wherein the second thickness area has first and second linear sidewalls that meet at a point to form triangular shape.

20. The apparatus of claim 1, wherein the second thickness area has a continuously linear sidewall connecting first and second continuously curvilinear sidewalls.

\* \* \* \* \*